United States Patent
Ganesan et al.

(10) Patent No.: US 8,571,098 B1
(45) Date of Patent: *Oct. 29, 2013

(54) VARIABLE BIT RATE ENCODING

(75) Inventors: Prasanna Ganesan, Menlo Park, CA (US); Sumankar Shankar, Alwarpet (IN)

(73) Assignee: Vudu, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,776

(22) Filed: Feb. 1, 2012

Related U.S. Application Data

(63) Continuation of application No. 11/551,148, filed on Oct. 19, 2006, now Pat. No. 8,135,061.

(51) Int. Cl.
*H04N 7/12* (2006.01)
(52) U.S. Cl.
USPC .................................. 375/240.02; 375/240.03

(58) Field of Classification Search
USPC ............... 375/240, 240.01, 240.02, 240.03, 375/240.12
See application file for complete search history.

(56) References Cited

U.S. PATENT DOCUMENTS

2006/0171455 A1* 8/2006 Mohsenian ............. 375/240.03

* cited by examiner

*Primary Examiner* — Allen Wong
(74) *Attorney, Agent, or Firm* — David R. Stevens; Stevens Law Group

(57) ABSTRACT

A system, machine-readable medium and method for processing video comprising a video segmentor configured to receive a source video and to split the source video into segments; a bit rate allocator configured to receive the segments and generate target bit rates corresponding to the segments; a first encoder coupled to receive the plurality of segments and the target bit rates and configured to encode each of the segments using one of the target bit rates to generate encoded segments; and an output generator configured to receive the encoded segments and generate an encoded video.

20 Claims, 9 Drawing Sheets

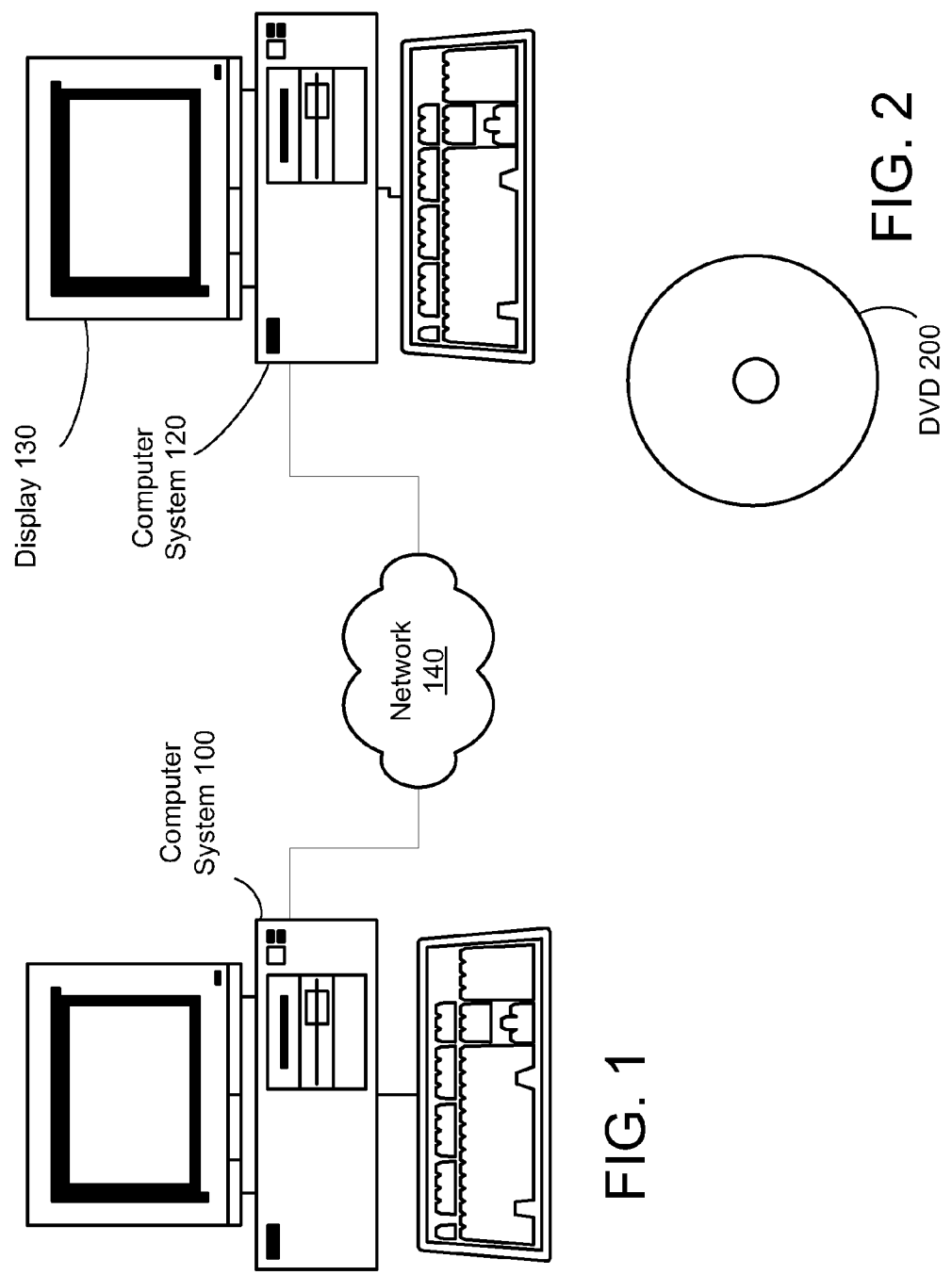

VARIABLE BIT RATE ENCODING

RELATED APPLICATIONS

This application is a continuation of U.S. application Ser. No. 11/551,148 filed Oct. 19, 2006, now patented as U.S. Pat. No. 8,135,061 issued on Mar. 13, 2012, and entitled "Variable Bit Rate Encoding", the aforementioned application being hereby incorporated by reference in its entirety.

BACKGROUND

1. Field of the Invention

This invention relates generally to the field of video systems. More particularly, the invention relates to a system, apparatus and method for streaming videos.

2. Description of the Related Art

Video on Demand (VOD) systems allow users to request and view videos over a network. The video is compressed in order to transmit the information over a network with limited bandwidth.

Constant bit rate (CBR) compression allocates a constant number of bits to each frame or small number of frames of the video. By using a bit rate that is less than the download rate of the network, CBR video can be streamed over that network. However, CBR compression compromises video quality because some frames of video may have more image complexity than others and some frame-to-frame image changes may be more significant than others.

Variable bit rate (VBR) compression generally achieves better image quality than CBR compression for a given bit rate by assigning less bits to the simpler frames and more bits to the more complex frames. However, during periods of complex video sequences, the bandwidth required may exceed the download rate of the network. Thus, VBR compressed video generally cannot be streamed without a large buffer to cushion against periods of bandwidth deficits. Larger buffers require longer delays to fill before viewing can begin.

Constant average bit rate (CABR) compression is a compromise between CBR compression and VBR compression. CABR compression uses a buffer that grows by the target bit rate each frame. The bits in the buffer decrease by the bits used for that frame. No more bits can be used than those in the buffer and any unused bits are made available to subsequent frames. Thus, CABR compression allows for some cross frame allocation of bits to improve video quality while the buffer constrains the average bit rate over a limited number of frames. CABR video can be streamed.

What is needed is a video compression scheme that allows for more flexibility in bit allocation to improve video quality while allowing for the compressed video to be streamed.

SUMMARY

A system, machine-readable medium and method for processing video are described. According to some embodiments, the system includes a video segmentor configured to receive a source video and to split the source video into segments; a bit rate allocator configured to receive the segments and generate target bit rates corresponding to the segments; an encoder coupled to receive the segments and target bit rates configured to encode each of the segments; and an output generator configured to receive the encoded segments and generate an encoded video.

In some embodiments, the bit rate allocator includes a complexity estimator and an allocation logic. The complexity estimator is configured to generate complexity information for each of the segments. The bit rate allocator is configured to receive the complexity information and generate the target bit rates.

In some embodiments the segments each have a set of first quality levels based on the complexity information. The allocation logic is configured to adjust the first quality levels to a set of second quality levels to an extent that a model of a streaming video system predicts that the streaming video system can stream a sequence of the encoded segments using the second quality levels.

BRIEF DESCRIPTION OF THE DRAWINGS

These and other features, aspects, and advantages of the present invention will become better understood with regard to the following description, appended claims, and accompanying drawings where:

FIG. 1 illustrates a system for streaming a video according to one embodiment of the invention.

FIG. 2 is a representation of one embodiment of a machine-readable medium of the present invention.

DETAILED DESCRIPTION OF PREFERRED EMBODIMENTS

Described below are a system, machine readable medium and method for streaming video. Throughout the description, for the purposes of explanation, numerous specific details are set forth in order to provide a thorough understanding of the present invention. It will be apparent, however, to one skilled in the art that the present invention may be practiced without some of these specific details. In other instances, well-known devices and methods are not included in the description or shown in the figures to avoid obscuring the underlying principles of the present invention.

Embodiments of the invention may be implemented in a video on demand (VOD) system as illustrated generally in FIG. 1. The VOD system includes a computer system 100 including coupled through a network 140 to a computer system 120 including a display 130.

In one embodiment, the computer system 100 is configured to receive a video over the network 140 or from a DVD, for example, and encode the video according to a method of the present invention. The encoded video can then be streamed over the network 140 and received by the computer system 120 to be presented on the display 130.

In some embodiments, the streaming video system of the present invention uses special-purpose hardware to generate the encoded video. In some embodiments, a centralized server streams the encoded video over the network to systems configured to receive and present the video. These systems can include special purpose hardware to decode the video received from the network and televisions and other display systems to display the decoded video. In other embodiments, the streaming video system is configured to transmit and receive video in a peer-to-peer network configuration.

FIG. 2 illustrates one embodiment of a machine-readable medium of the present invention. A DVD 200 is a digital versatile disc also known as a digital video disc. The DVD 200 can be used to store software to execute an embodiment of a method of the present invention. Machine-readable mediums include dynamic random access memory (DRAM), flash memory, and a hard disk drive, for example.

Figure 3:
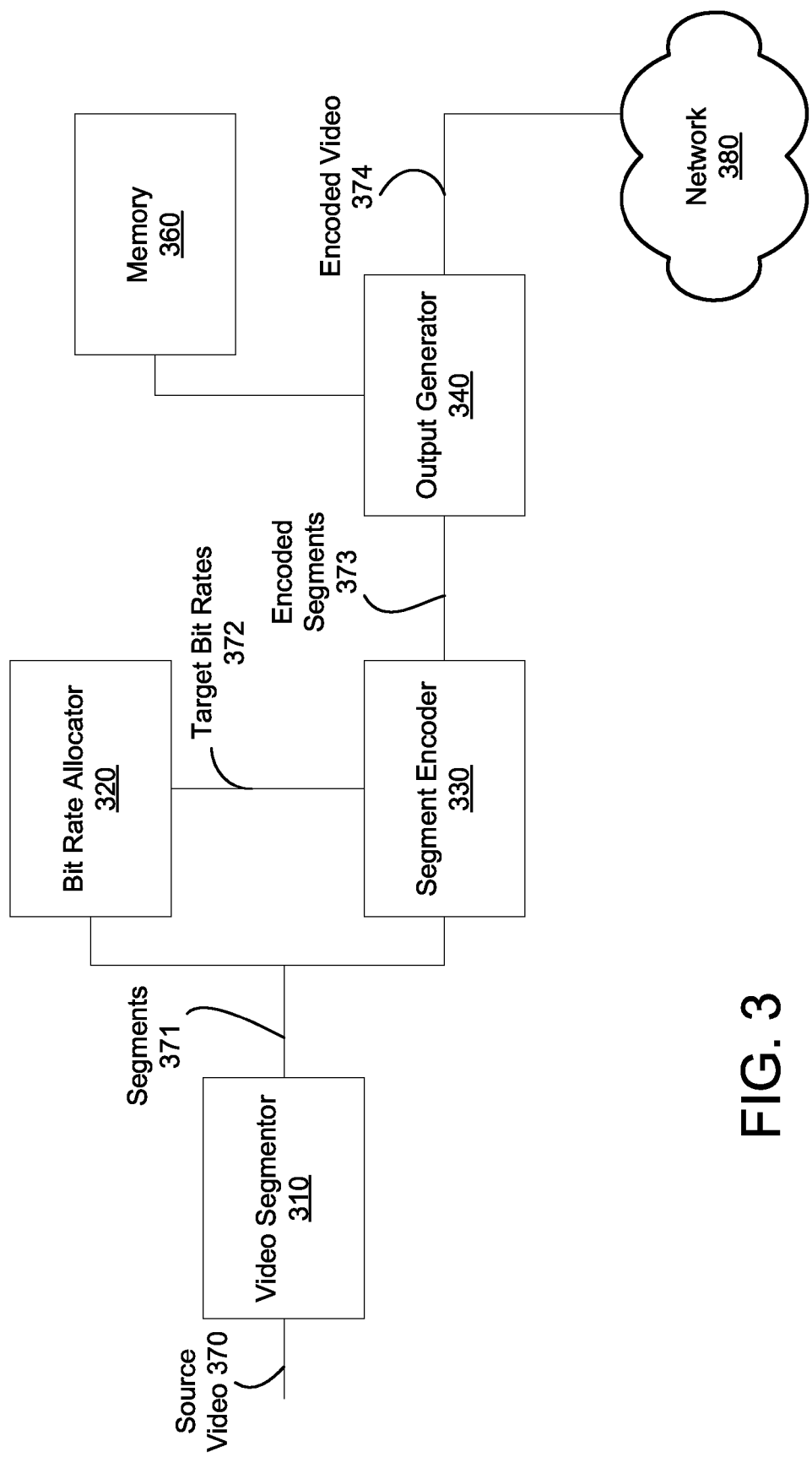
FIG. 3 is a block diagram of one embodiment of streaming video system of the present invention.

FIG. 3 illustrates a block diagram of one embodiment of a video streaming system of the present invention.

A video segmenter 310 is configured to receive a source video 370 and split the source video 370 into segments 371. In one embodiment, the video is uniformly split among the segments such that each segment has the same number of frames. In other embodiments, the video is split unevenly. The present invention is not limited to any particular video format. For example, the format of the video 370 may be Digital Video (DV) Encoder Type 1, DV Encoder Type 2, MPEG-1 (Moving Picture Experts Group 1 format), MPEG-2, MPEG-4, or Real Video.

A bit rate allocator 320 receives the segments 371 and generates target bit rates 372 each corresponding to one of the segments 371. In one embodiment, the bit rate allocator 320 is configured to allocate target bit rates to each segment to manage quality so that the streaming video system can stream the video using those target bit rates under nominal conditions of the streaming video system.

A segment encoder 330 receives the segments 371 and the target bit rates 372. The segment encoder 330 encodes each of the segments 371 using the corresponding one of the target bit rates 372 to generate encoded segments 373. In one embodiment, each of the segments 371 is a single frame of the source video 370. The segment encoder 330 encodes the frame in each segment using the corresponding one of the target bit rates 372. Alternatively, each of the segments 371 is a sequence of frames of the source video 370. The segment encoder 330 encodes the sequence of frames in each segment using the corresponding one of the target bit rates 372. In one embodiment, the segment encoder 330 uses variable bit rate (VBR) encoding. In other embodiments, the segment encoder 330 can use other encoding methods such as constant bit rate (CBR) encoding.

An output generator 340 is configured to receive the encoded segments 373 and generate an encoded video 374. In one embodiment, the output generator 340 stores the encoded video 374 in a memory 360 and subsequently streams the encoded video 374 on a network 380. The memory 360 can be a DVD, DRAM, hard disk memory or flash memory, for example. In some embodiments, the encoded video 374 is transmitted to a server which streams the video 374 on network 380. Alternatively, the output generator 340 streams the encoded video 374 directly onto the network 380.

Figure 4:
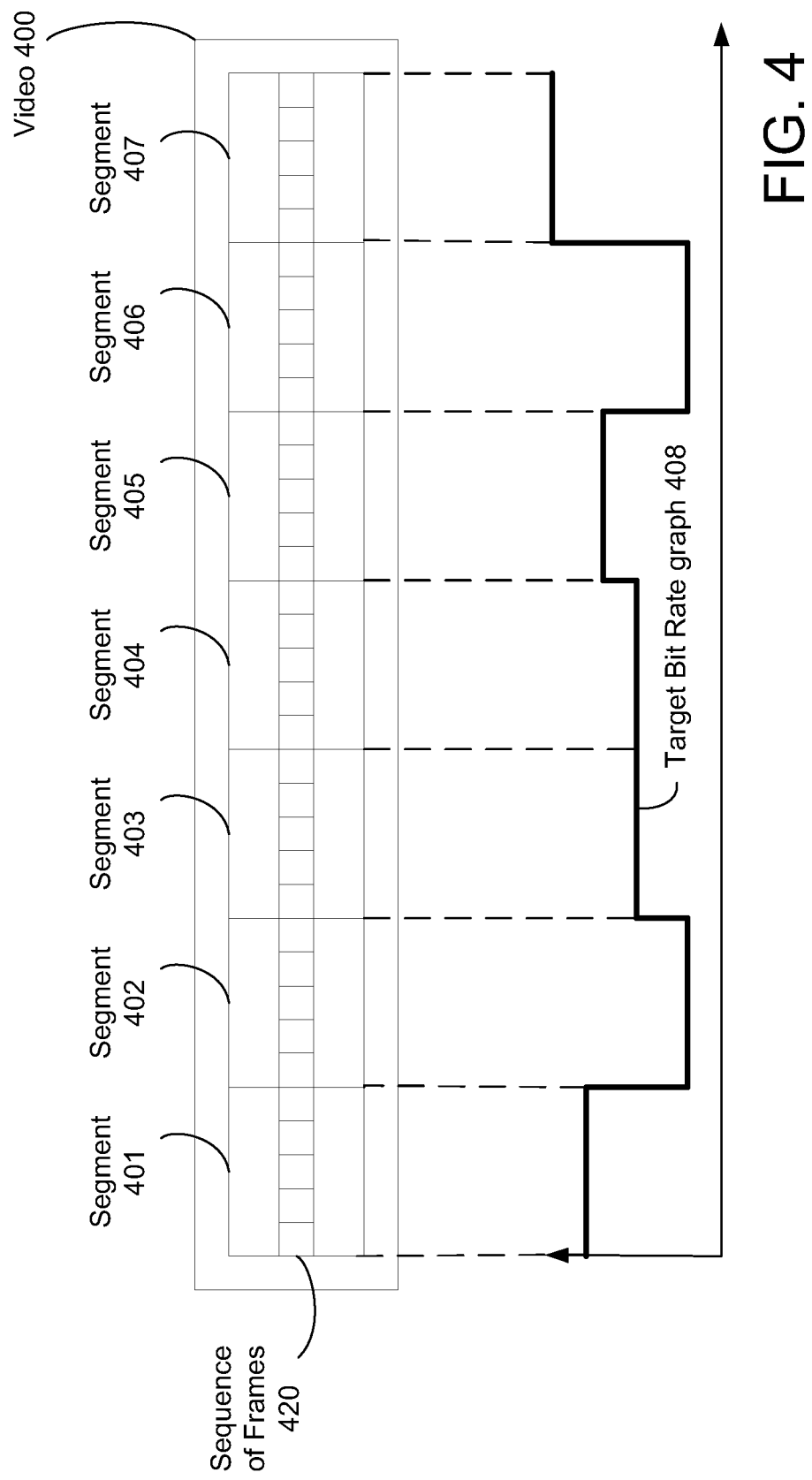
FIG. 4 is a diagram of the relationship between target bit rates and segments according to one embodiment of the invention.

FIG. 4 shows a diagram of one embodiment of a relationship between the target bit rates and the segments.

In the illustrated embodiment, a video 400 having a sequence of frames 420 is split into a segment 401, a segment 402, a segment 403, a segment 404, a segment 405, a segment 406, and a segment 407. Each of the segments consists of five frames of the sequence of frames 420.

A target bit rate graph 408 shows the variation in the target bit rates as a function of segment. In the illustrated embodiment, the segment 407 is allocated a higher bit rate than the segment 402. By controlling the allocation of the target bit rates among the segments, more bits can be allocated to segments with more complex video and less bits can be allocated to segments with less complex video so that overall video quality can be improved for a given overall average bit rate.

The size of each segment is chosen to be small enough to provide fine-grained control over the bit-rate allocation in the encoded video. In one embodiment, each segment is a single frame of video, enabling control of the bits allocated to each frame of video. In other embodiments, each segment is a sequence of many frames of video spanning seconds of video playback time.

Figure 5:
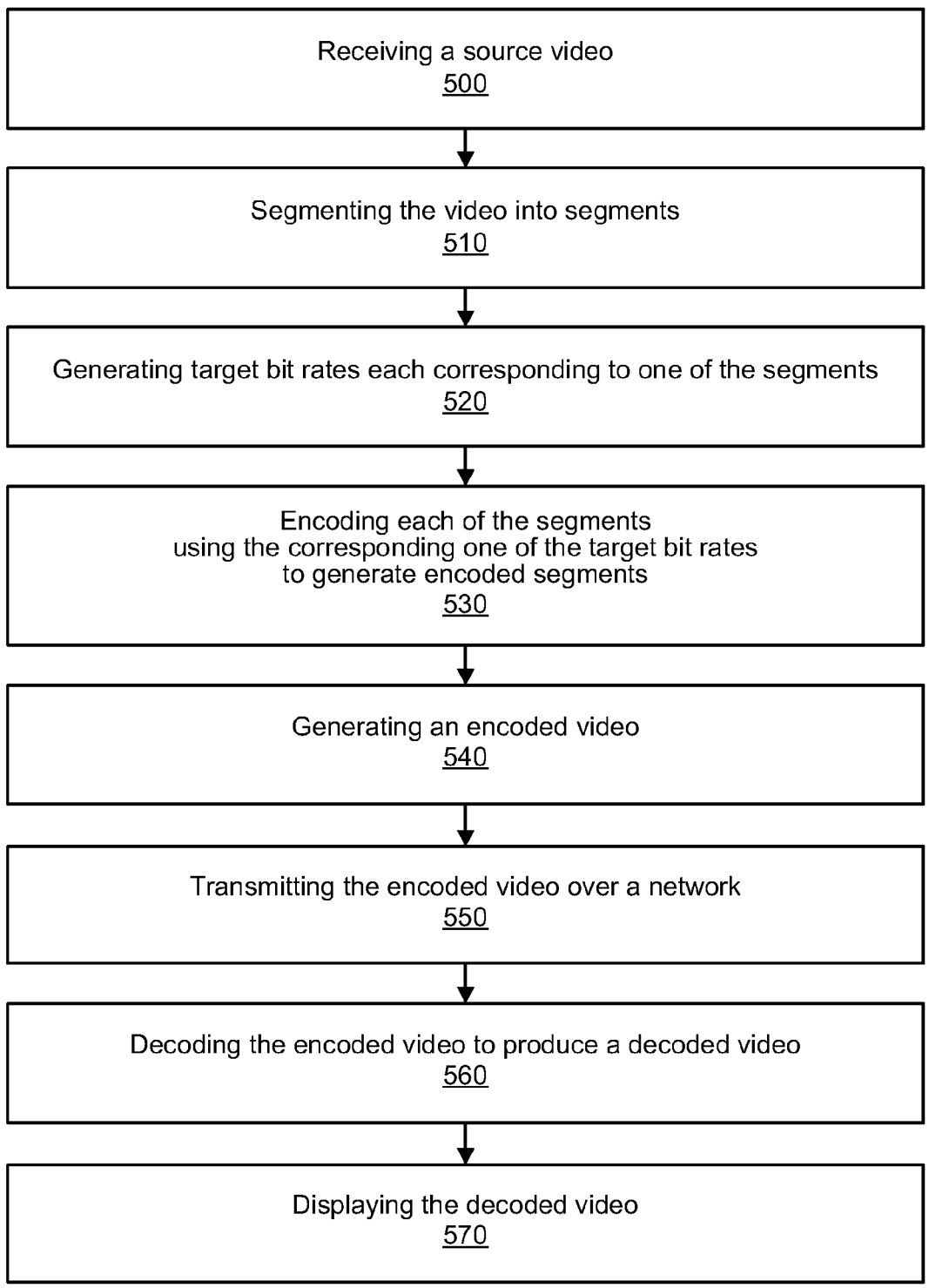
FIG. 5 is a flow chart that illustrates an embodiment of a method of streaming video.

FIG. 5 illustrates one embodiment of a method of streaming video according to the present invention.

In step 500, a source video is received. The source video can be in a format using VBR encoding, CBR encoding, or constant average bit rate (CABR) encoding. Other encoding methods may be used.

In step 510, the source video is split into segments. In one embodiment each segment is a single frame of the source video. In other embodiments, each segment is a sequence of frames of the source video.

In step 520, target bit rates corresponding to each of the segments is generated.

In some embodiments, the source video is encoded in a VBR format and the target bit rates are the average bit rate used in each segment of the source video. In other embodiments, the target bit rates are based on the average bit rate used in each segment of the source video, but adjusted to be within the constraints of the streaming video system.

In another embodiment, an encoding process is applied to each segment of the source video and the target bit rates are the average bit rates assigned to each segment of the source video by the encoding process. In some embodiments, the target bit rates are based on the average bit rate assigned to each segment of the source video by the encoding process, but adjusted to be within the constraints of the streaming video system.

In step 530, each of the segments is encoded using a corresponding one of the target bit rates to generate the encoded segments. In one embodiment, each segment is encoded using VBR encoding. In other embodiments, each segment is encoded using other encoding methods.

In step 540, an encoded video is generated. In one embodiment, the encoded segments are generated in sequence to produce an encoded video. In another embodiment, the encoded segments are generated in parallel and sequenced to generate an encoded video.

In step 550, the encoded video is streamed. In one embodiment, the encoded video is directly streamed onto a network. In another embodiment the encoded video is stored in a memory and the memory is subsequently accessed to stream the encoded video. In yet another embodiment the encoded video is transferred to a server which streams the video upon request.

In step 560, the encoded video is decoded to generate a decoded video. The decoded video is in a format suitable for being transmitted to a display system.

In step 570, the decoded video is displayed. The decoded video may be displayed on a computer monitor, television and other display devices for displaying video.

Figure 6:
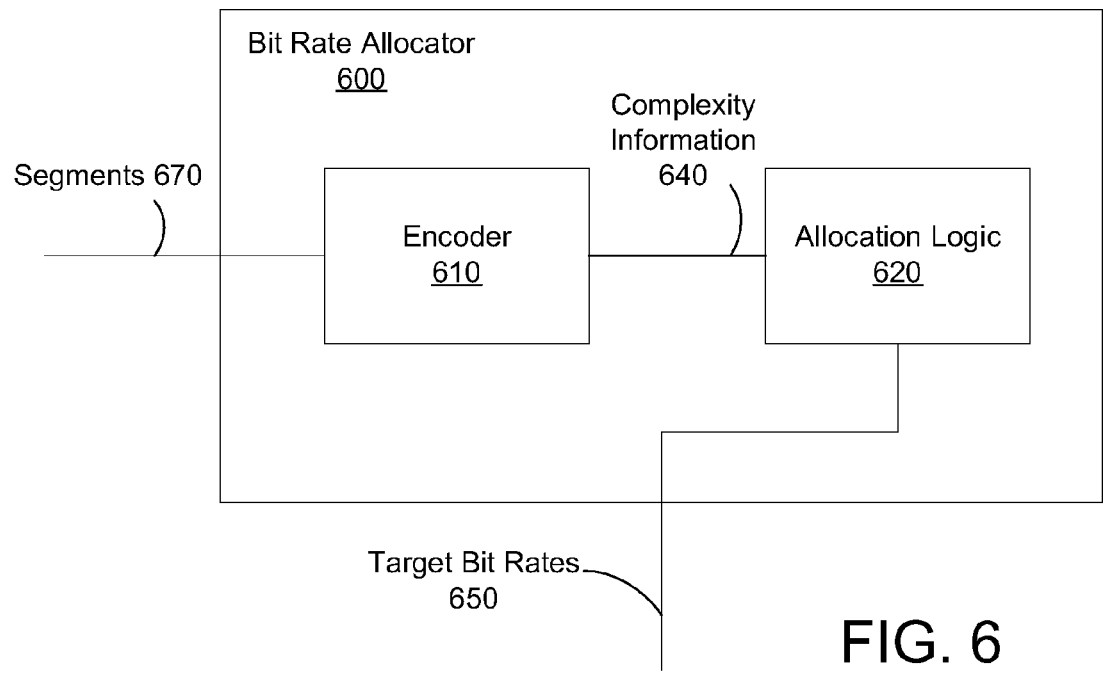
FIG. 6 is a block diagram of a bit rate allocator using an encoder according to one embodiment of the invention.

FIG. 6 illustrates one embodiment of a bit rate allocator of the present invention. An encoder 610 is configured to receive the segments 670, encode the segments 670 and generate complexity information 640. In one embodiment, the complexity information 640 includes the average bit rate allocated to each of the segments 670. In another embodiment, the complexity information 640 includes additional meta-data such as frame types, macroblock types, quantizer, and motion vectors used when encoding the segments 640.

In some embodiments, the encoder 610 uses the same encoding algorithm as the segment encoder 330 shown in FIG. 3. In one embodiment, the segment encoder 330 is configured to be in a mode to generate encoded video that can be decoded into a presentation quality video and the encoder 610 is configured to operate rapidly to provide an indication of the relative complexity of each of the segments 670 rather than produce high quality video. In some embodiments, the encoder 610 is configured to operate in a super-fast, constant quality, one pass mode. In other embodiments, when the available time for encoding is not a constraint, the encoder 610 is configured to use more time to produce better quality video compression.

The allocation logic 620 is configured to receive the complexity information 640 and generate target bit rates 650 corresponding to each of the segments 670.

In one embodiment, the allocation logic 620 uses the target bit rates in the complexity information 640 as the target bit rates 670. In another embodiment, the allocation logic 620 is configured to adjust the target bit rates in the complexity information 640 to maintain streaming capability. The complexity information 640 can include meta-data used to derive accurate estimates of the video quality that may be achieved for each segment at various target bit rates. Using a model of the streaming video system, the allocation logic 620 predicts whether the streaming video system has the capacity to stream the segments 670 encoded with the target bit rates 650.

The model of the streaming video system is based on the characteristics of the streaming video system. Some characteristics, such as network bandwidth, may be fixed by the system configuration. A streaming video system with higher network bandwidths can sustain higher average bit rates. Other streaming video system characteristics, such as buffer size, may be varied within the constraints of a given system configuration. A streaming video system that employs a longer initial delay to build a larger buffer can tolerate longer periods in which the bit rate exceeds the network bandwidth but requires a longer delay between the time the video begins downloading and the time the video presentation begins.

Figure 7:
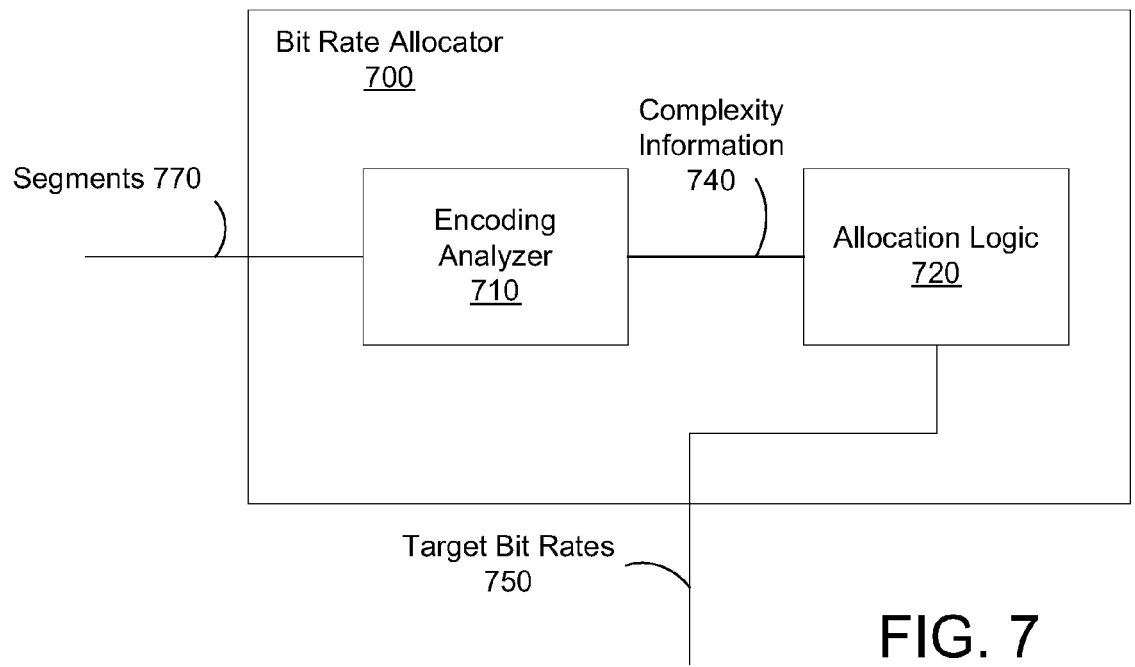
FIG. 7 is a block diagram of a bit rate allocator using an encoding analyzer according to an embodiment of the invention.

FIG. 7 illustrates another embodiment of a bit rate allocator of the present invention. In this embodiment, the segments 770 are encoded. An example of an encoded format is MPEG-2. Each of the segments 770 has an average bit rate that depends on the allocation of bits to the frames in that segment.

An encoding analyzer 710 is configured to receive the segments 770 and analyze the encoding of the segments 770 to determine the complexity information 640. In one embodiment, the complexity information 740 includes the average bit rate allocated to each of the segments 770. In another embodiment, the complexity information includes additional meta-data such as frame types, macroblock types, quantizer and the motion vectors used in each segment.

An allocation logic 720 is configured to receive the complexity information 740 and generate target bit rates 750. The allocation logic 720 can be configured in embodiments similar to those described with reference to the allocation logic 620.

Figure 8:
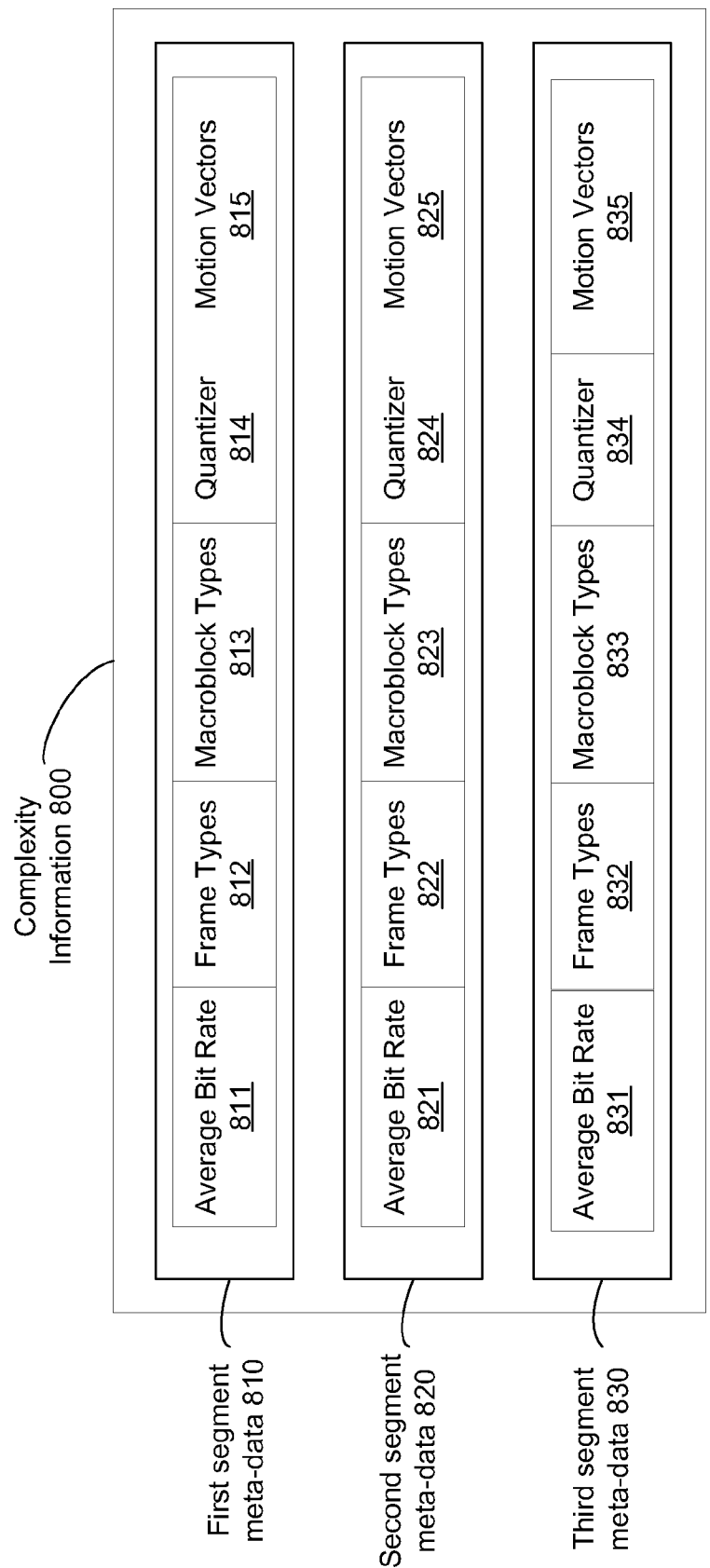
FIG. 8 is a block diagram that illustrates one embodiment of complexity information.

FIG. 8 illustrates one embodiment of the complexity information of the present invention.

The complexity information 800 comprises a first segment meta-data 810, a second segment meta-data 820 and a third segment meta-data 830. The first segment meta-data 810 includes an average bit rate 811, frame types 812, macroblock types 813, quantizer 814 and motion vectors 815. The average bit rate 811 is the average bit rate allocated to the first segment. The frame types 812 are the data that indicate the use of frame types, such as intracoded frames, predictive coded frames and bi-directionally coded frames, within the first segment. The macroblock types 813 indicate the use of macroblock types used within the first segment. The quantizers 814 are the quantizers used in the first segment. The motion vectors 815 are the motion vectors used in the first segment.

A second segment meta-data 820 includes an average bit rate 821, frame types 822, macroblock types 823, quantizer 824 and motion vectors 825. The third segment meta-data 830 includes an average bit rate 831, frame types 832, macroblock types 833, quantizer 834 and motion vectors 835. The elements of the second segment meta-data 820 and the third segment meta-data 830 are analogous to the first segment meta-data 810 except they apply to the second and third segments, respectively.

Three segments are shown for illustration. In other embodiments, the complexity information includes meta-data for more segments. According to some embodiments, the complexity information 800 is used to derive accurate estimates of the video quality that may be achieved for each segment at various target bit rates. The complexity data 800 is not limited to the meta-data types illustrated here.

Figure 9:
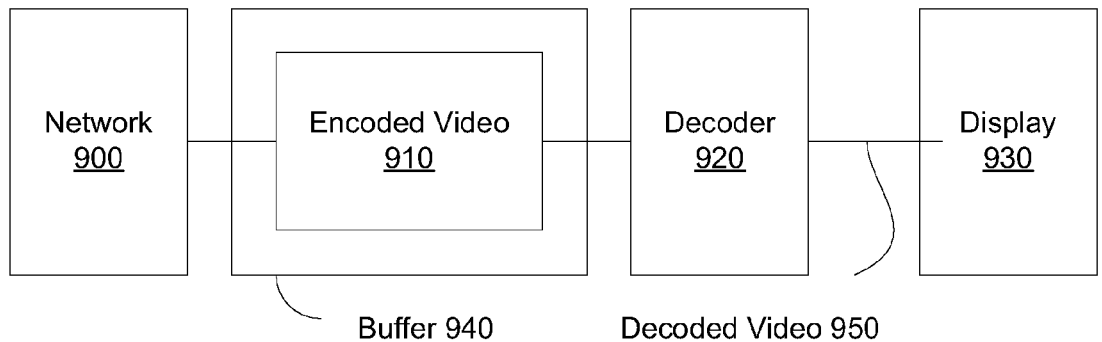
FIG. 9 is a block diagram that illustrates one embodiment of a streaming video system.

FIG. 9 is a block diagram illustrating one embodiment of a streaming video system. A buffer 940 receives a video streaming over a network 900. In one embodiment, the network 900 includes a server that streams the video over the network 900. An encoded video 910 is the portion of the streaming video that is stored in the buffer at any given time.

A decoder 920 receives the encoded video 910 from the buffer 940. The decoder 920 decodes the encoded video 910 to generate a decoded video 950. The display 930 displays the decoded video 950. In order for the decoder 920 to provide the display 930 with a continuous stream of decoded video 950, the decoder 920 must receive the encoded video 910 in a timely manner.

Figure 10:
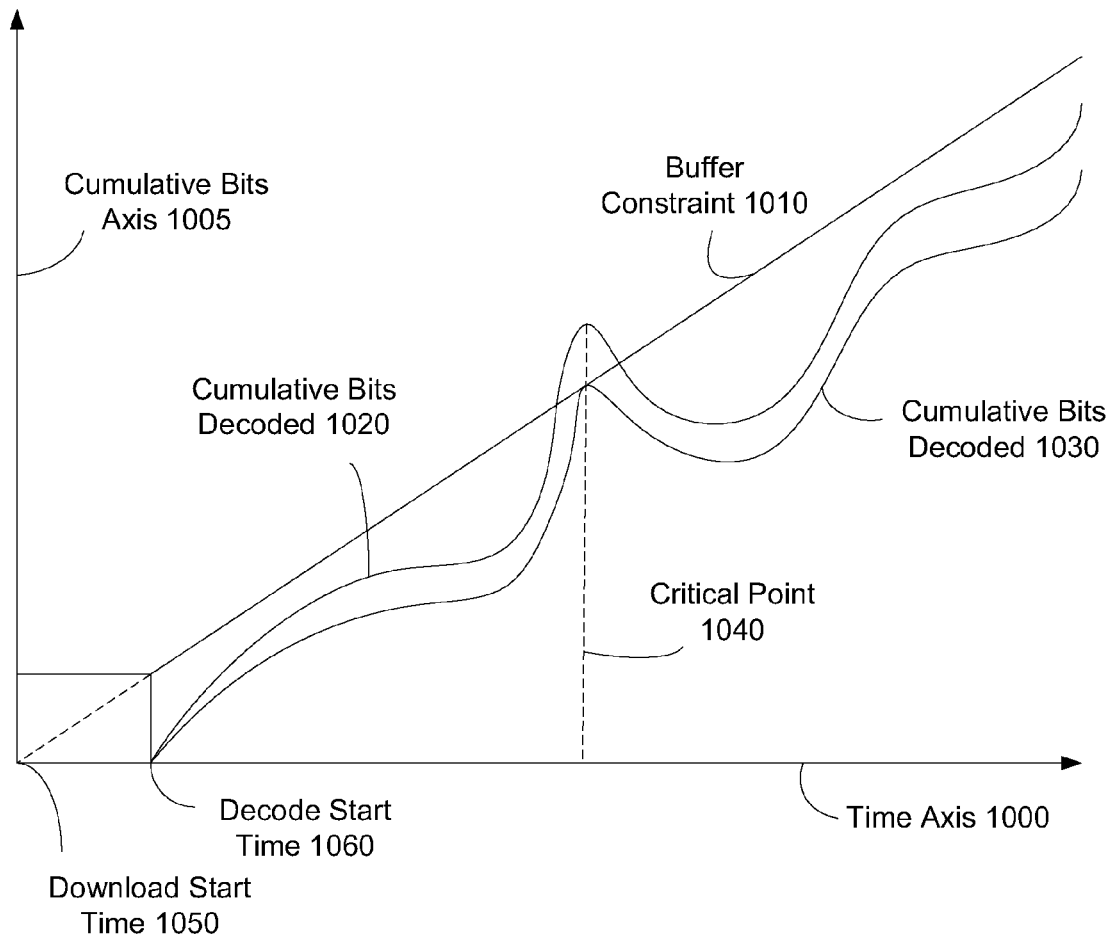
FIG. 10 is a graph that illustrates an embodiment of a model of a streaming video system

FIG. 10 is a graph illustrating one embodiment of a model of the streaming video system described with reference to FIG. 9.

The graph has a time axis 1000 and a cumulative bits axis 1005. At a download start time 1050, the buffer 940 begins to receive bits of a video from the network 900. The encoded video 910 is the portion of the video that is stored in the buffer at any given time. At a decode start time 1060, the decoder 920 begins to access the buffer 940 to receive bits of the encoded video 910. The delay between the download start time 1060 and the decode start time 1050 allows the buffer 940 to download the encoded video 910 ahead of the decoder. The longer the delay, the more margin the system has to tolerate video bit rates that are higher than the download rate.

But a longer delay also increases the wait before the video requester begins to see the video.

A buffer constraint 1010 indicates the cumulative bits that have been received into the buffer 940 at any point in time. The slope of the buffer constraint 1010 is the download rate of the network 900. Cumulative bits decoded 1020 illustrates the cumulative bits used by the decoder 920 to decode a video encoded at given quality levels according to the model of the streaming video system. In one embodiment, the quality levels for each segment of the video are indicated by the complexity information generated by a target bit rate allocator.

The slope of the cumulative bits decoded 1020 at a given point in time is the rate of bits used by the decoder at that point in time to maintain a continuous stream of the decoded video 950. At some times, the decoding rate is greater than the download rate. Under such conditions, the buffer 940 can sustain the operation of the decoder 920 for a limited period of time. During this period, the buffer 940 is being emptied by the decoder 920 at a faster rate than it is being filled by the network 900. The buffer 940 will eventually become empty if the bit rate usage continues to exceed the download rate. When the buffer is empty, the decoder 920 stalls if it requires a higher bit rate than the download rate. In such cases the decoder 920 cannot maintain the continuous stream of the decoded video 950. The presentation of the decoded video 950 on the display 930 stalls. Video stalling compromises the experience of viewing the video.

When the cumulative bits decoded 1020 exceeds the buffer constraint 1010, the buffer 940 is empty. A streaming video system would stall if it required bits that were not available in the buffer 940. In the model, the cumulative bits decoded 1020 continue to accumulate as if the decoder could continue to run. At a critical point 1040, the cumulative bits decoded 1020 most exceeds the buffer constraint 1010.

In order to avoid exceeding the constraint, the bit consumption usage prior to the critical point 1040 can be reduced by the extent that the cumulative bits decoded 1020 exceeds the buffer constraint 1010 at the critical point 1040. Cumulative bits decoded 1030 illustrates the cumulative bits used by the decoder 920 to decode a video encoded at adjusted quality levels according to the model of the streaming video system. In one embodiment, the quality levels are adjusted to reduce the bit rate consumption prior to the critical point 1040 to an extent that the model predicts that the streaming video system can stream the video at the adjusted quality levels. The cumulative bits decoded 1030 does not exceed the buffer constraint 1010.

By reducing quality levels uniformly throughout the period from the decode start time 1060 to the critical point 1040, the bit rate consumption is reduced while distributing the degradation in quality evenly and over the longest relevant period. By distributing the quality reduction over the longest relevant period, the required cumulative bit reduction can be achieved while the quality reduction required at any given point in time is reduced. Alternatively, quality reduction may be distributed unevenly.

In one embodiment, the model predicts that the streaming video system can stream the video based on the nominal specifications of the streaming video system. If the streaming video system does not perform to the modeled specifications, the streaming video may in fact stall in the streaming video system. In some embodiments, some margin for system performance degradation is incorporated into the model to reduce the likelihood that the streaming video may stall in the streaming video system.

In some embodiments, cumulative bits 1020 does not exceed the buffer constraint 1010. No quality level adjustment is necessary to allow for the video to be streamable on the streaming video system. However, there may be some margin for quality levels to be increased. In this case, the critical point is the point in which there is the least margin in the buffer constraint. Quality levels can be increased throughout the video (before and after the critical point) to take advantage of the margin in the constraint. In other embodiments, the model may include more than one constraint and quality levels may be adjusted to satisfy all of these constraints and take advantage of any margin in these constraints.

Figure 11:
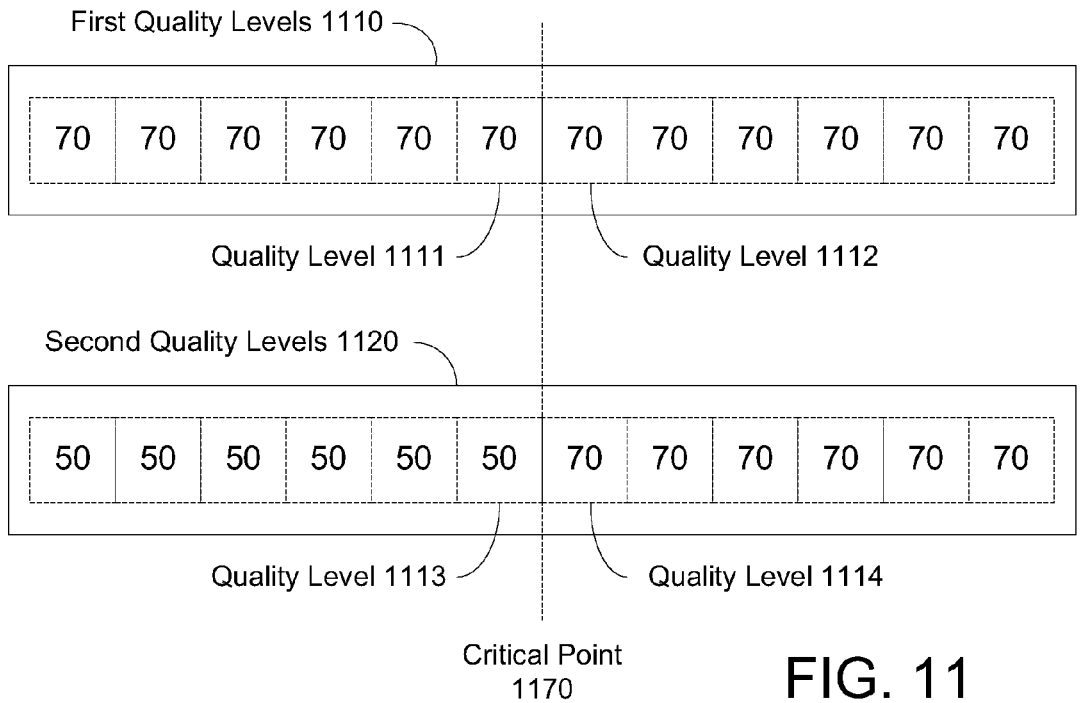
FIG. 11 is a block diagram that illustrates a quality adjustment with an abrupt transition according to one embodiment of the present invention.

FIG. 11 is a diagram that illustrates a quality adjustment using an abrupt transition according to one embodiment of the present invention.

First quality levels 1110 include quality levels corresponding to each segment in a sequence of segments of the video. Each quality level includes a numeric indication of the quality level. In one embodiment, the quality level may be indicated by the average bit rate allocated to the segment.

A critical point 1170 is the point where a model of the streaming video system indicates that the cumulative bits decoded most exceeds a constraint of the streaming video system. In some embodiments, the critical point 1170 corresponds to the boundary between segments. In other embodiments, the critical point 1170 corresponds to the boundary between frames, which may be within a multi-frame segment.

In the illustrated example, the first quality levels 1110 are 70 for all the segments. This quality level is determined by complexity information generated by the bit rate allocator. In some embodiments, the first quality levels vary by segment.

Second quality levels 1120 include quality levels corresponding to each segment in a sequence of segments of the video as adjusted by the allocation logic. For example, a quality level 1111 in the first quality levels 1110 is reduced to a quality level 1113 in the second quality levels 1120 before the critical point 1170.

Since the quality levels after the critical point 1170 do not have an effect on the cumulative bits used at the critical point 1170, the quality levels are not reduced after the critical point 1170. For example, a quality level 1112 in the first quality levels 1110 remains the same in a quality level 1114 in the second quality levels 1120 after the critical point 1170.

In the illustrated embodiment, the transition between the quality levels before the critical point 1170 and after the critical point 1170 is an abrupt transition. The quality level 1113 corresponding to the last segment before the critical point 1170 is 50. The quality level 1114 corresponding to the first segment after the critical point 1170 is 70. The abrupt transition may result in a noticeable discontinuity in the quality of the video. This discontinuity may compromise the experience of viewing the video.

Figure 12:
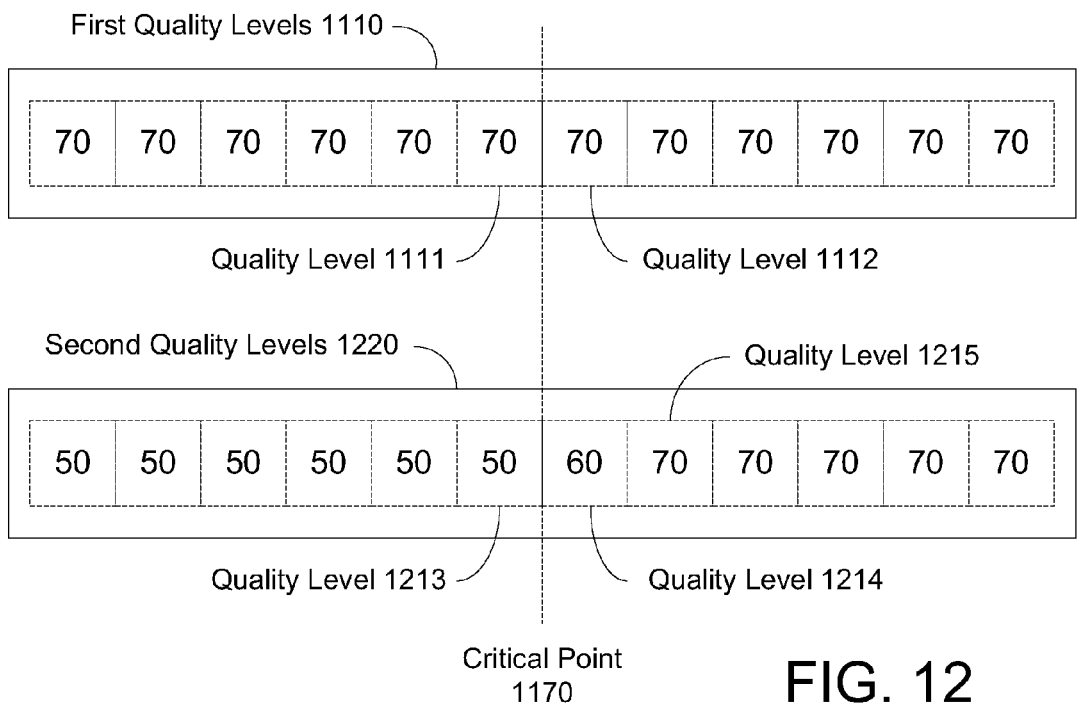
FIG. 12 is a block diagram that illustrates a method of allocating target bit rates according to one embodiment of the present invention.

FIG. 12 is a diagram that illustrates a quality adjustment using a smoothed transition according to one embodiment of the present invention. In this case, the elements are identical to those illustrated in FIG. 11 except that quality level 1214 is 60. The transition from 50 at quality level 1213 to 70 at quality level 1215 happens over one more segment as compared to the abrupt transition illustrated in FIG. 11. In other embodiments, the transition may happen over more segments to generate a smoother transition.

Figure 13:
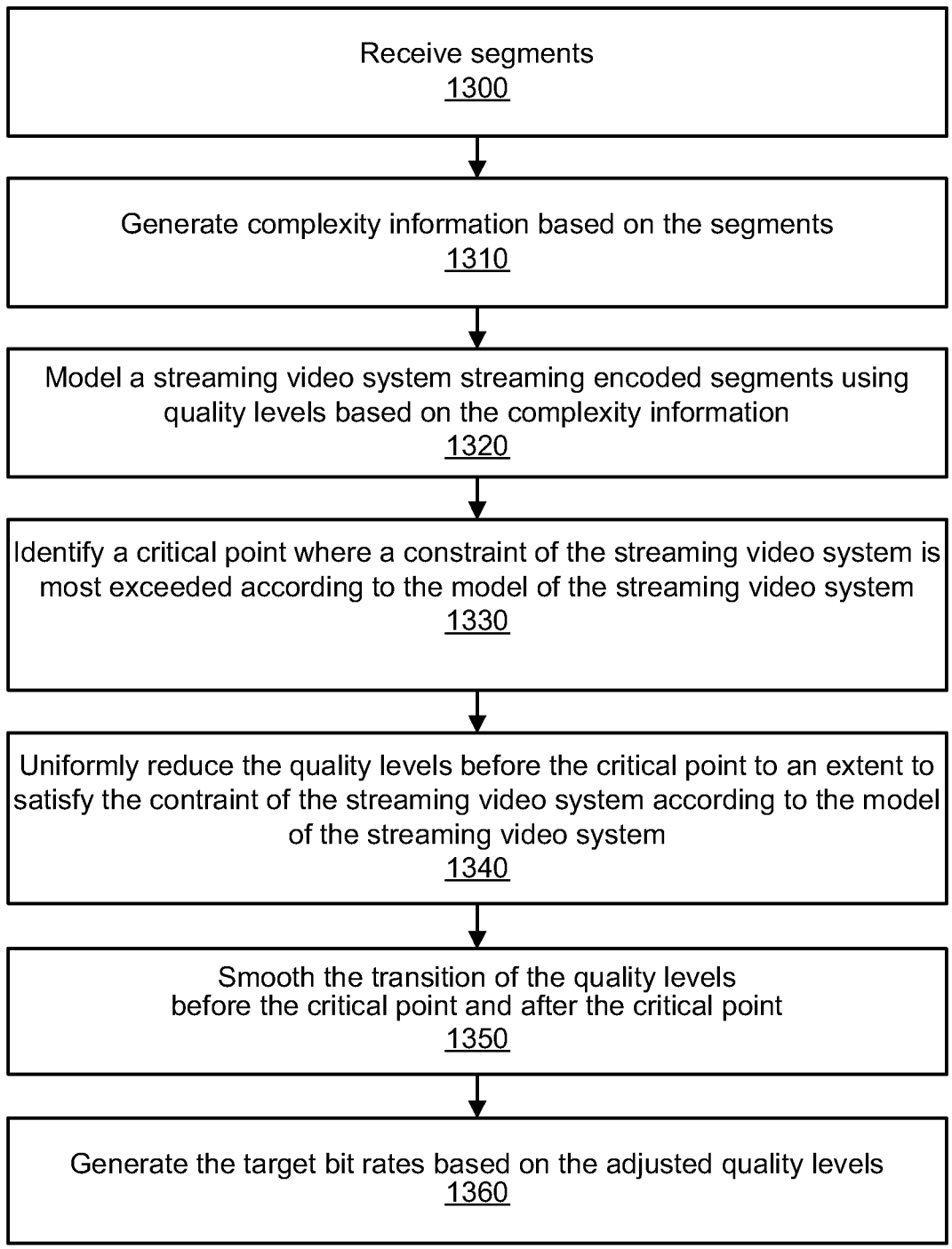
FIG. 13 is a flow chart that illustrates a method of allocating target bit rates according to one embodiment of the present invention.

FIG. 13 is a flow chart that illustrates a method of allocating target bit rates according to one embodiment of the present invention.

In step 1300, segments are received. In some embodiments, the received segments are in an encoded format, such as MPEG-2.

In step 1310, complexity information is generated based on the segments. In one embodiment, the complexity information is generated by analyzing the encoding of the segments as received. In another embodiment, the complexity information is generated by encoding the segments using an encoding process. In one embodiment, the complexity information includes meta-data including the average bit rate, frame types, macroblock types, quantizer, and motion vectors used in each segment.

In step 1320, a streaming video system is modeled streaming the encoded video using quality levels based on the complexity information. In one embodiment, the model includes a buffer constraint indicating the cumulative bits downloaded into a buffer at any point in time. Other constraints may be used.

In step 1330, a critical point is identified where a constraint of the streaming video system is most exceeded according to the model of the streaming video system. In one embodiment, the critical point is the point where the cumulative bits decoded most exceeds the buffer constraint.

In step 1340, the quality levels are uniformly reduced before the critical point to an extent to satisfy the constraint of the streaming video system according to the model of the streaming video system. In other embodiments, the quality is reduced unevenly before the critical point.

In step 1350, the transition between the quality levels before the critical point and the quality levels after the critical point is smoothed. In one embodiment, the transition between the quality levels before the critical point and the quality levels after the critical point changes linearly over the quality levels corresponding to two or more segments in the transition.

In step 1360, the target bit rates for each segment are generated based on the adjusted quality levels. Thus, target bit rates are allocated to manage quality within the constraints of the streaming video system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer-implemented method for processing a plurality of video segments of a video in a video system, the method comprising:
   identifying complexity information for each of the plurality of video segments, the complexity information identifying a first quality level for each of the plurality of video segments;
   predicting a time when a total amount of data decoded will exceed a buffer constraint when each of the plurality of video segments having the first quality level are decoded and streamed in the video system; and
   in response to determining the time, (i) adjusting some of the first quality levels of some the plurality of video segments to a respective second quality level, and (ii) generating a plurality of target bit rates to encode the plurality of video segments based on the first quality levels and second quality levels of the plurality of video segments.

2. The method of claim 1, wherein predicting the time includes determining a predictive model for decoding and streaming video in the video system based on the complexity information for each of the plurality of video segments, and wherein the buffer constraint represents an amount of data being downloaded into a buffer of the video system.

3. The method of claim 1, wherein each of the plurality of video segments is a frame in a sequence of frames of the video.

4. The method of claim 1, wherein the complexity information for each of the plurality of video segments includes metadata corresponding to each respective video segment.

5. The method of claim 4, wherein the complexity information for each of the plurality of video segments includes information corresponding to frame types, macroblock types, quantizer or motion vectors for each respective video segment.

6. The method of claim 1, wherein adjusting some of the first quality levels of some of the plurality of video segments to the respective second quality level includes reducing the first quality levels of some of the plurality of video segments.

7. The method of claim 1, wherein the video system comprises a server, a network, and a computing device to receive the plurality of video segments from the server.

8. The method of claim 7, further comprising encoding each of the plurality of video segments using a corresponding target bit rate of the plurality of target bit rates.

9. The method of claim 8, further comprising transmitting each of the plurality of encoded video segments to the computing device over the network.

10. A system for processing a plurality of video segments comprising:
    a server configured to:
      identify complexity information for each of the plurality of video segments, the complexity information identifying a first quality level for each of the plurality of video segments;
      predicting a time when a total amount of data decoded will exceed a buffer constraint when each of the plurality of video segments having the first quality level are decoded and streamed in the system; and
      in response to determining the critical point, (i) adjust some of the first quality levels of some the plurality of video segments to a respective second quality level, and (ii) generate a plurality of target bit rates to encode the plurality of video segments based on the first quality levels and second quality levels of the plurality of video segments.

11. The system of claim 10, wherein the server is configured to predict the time by includes determining a predictive model for decoding and streaming video in the video system based on the complexity information for each of the plurality of video segments, and wherein the buffer constraint represents an amount of data being downloaded into a buffer of the system.

12. The system of claim 10, wherein each of the plurality of video segments is a frame in a sequence of frames of the video.

13. The system of claim 12, wherein the complexity information for each of the plurality of video segments includes information corresponding to frame types, macroblock types, quantizer or motion vectors for each respective video segment.

14. The system of claim 10, wherein the server is configured to adjust some of the first quality levels of some of the plurality of video segments to the respective second quality level by reducing the first quality levels of some of the plurality of video segments.

15. The system of claim 10, wherein the system further comprises:
    a network; and
    a computing device to receive the plurality of video segments from the server.

16. The system of claim 15, wherein the server is further configured to encode each of the plurality of video segments using a corresponding target bit rate of the plurality of target bit rates.

17. The system of claim 16, wherein the server is further configured to transmit each of the plurality of encoded video segments to the computing device over the network.

18. The system of claim 17, wherein the computing device is configured to decode each of the plurality of encoded video segments, generate a decoded video and present the decoded video on a display.

19. The system of claim 15, wherein the computing device is a television.

20. The system of claim 10, wherein the server is further configured to in response to determining that there is no critical point, generate a plurality of target bit rates based on the first quality levels of each of the plurality of video segments.

\* \* \* \* \*